United States Patent
Lin et al.

(10) Patent No.: US 9,501,141 B2
(45) Date of Patent: Nov. 22, 2016

(54) DISPLAY SYSTEM AND METHOD FOR ADJUSTING VISIBLE RANGE

(71) Applicant: AU Optronics Corporation, Hsin-Chu (TW)

(72) Inventors: Hung-Che Lin, Hsin-Chu (TW);
Shu-Wei Lin, Hsin-Chu (TW);
Sheng-Ju Ho, Hsin-Chu (TW);
Chih-Chieh Wang, Hsin-Chu (TW);
Chia-Hsiang Chiu, Hsin-Chu (TW);
Shang-Jie Wu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 16 days.

(21) Appl. No.: 14/332,753

(22) Filed: Jul. 16, 2014

(65) Prior Publication Data

US 2015/0177827 A1     Jun. 25, 2015

(30) Foreign Application Priority Data

Dec. 20, 2013   (TW) .............................. 102147574 A

(51) Int. Cl.
*G06F 3/01* (2006.01)
*G06F 3/00* (2006.01)
*H04N 13/04* (2006.01)

(52) U.S. Cl.
CPC ................ *G06F 3/01* (2013.01); *G06F 3/005* (2013.01); *G06F 3/011* (2013.01); *H04N 13/0404* (2013.01); *H04N 13/047* (2013.01); *H04N 13/0497* (2013.01)

(58) Field of Classification Search
CPC ................................ G06F 3/011; G06F 3/005
See application file for complete search history.

(56) References Cited

U.S. PATENT DOCUMENTS

| | | | |
|---|---|---|---|
| 6,377,295 B1 | 4/2002 | Woodgate et al. | |
| 7,561,217 B2 | 7/2009 | Hu et al. | |
| 2010/0240451 A1* | 9/2010 | Suzuki | A63F 13/10 463/30 |
| 2011/0193863 A1 | 8/2011 | Gremse et al. | |
| 2011/0316987 A1* | 12/2011 | Komoriya | G06K 9/00228 348/51 |
| 2013/0242067 A1 | 9/2013 | Jeong et al. | |

FOREIGN PATENT DOCUMENTS

| | | |
|---|---|---|
| CN | 103281545 | 9/2013 |
| CN | 103327349 | 9/2013 |

* cited by examiner

*Primary Examiner* — Shaheda Abdin
(74) *Attorney, Agent, or Firm* — WPAT, PC; Justin King

(57) ABSTRACT

A display device includes an image processing device and a 3D (three-dimensional) display device. The image processing device captures and processes images of a plurality of objects to obtain positions of the plurality of objects. When a distance between at least two of the plurality of objects is smaller than a predetermined distance, the image processing device sets the at least two objects as a first group and sets an object of the plurality of objects that is closest to the first group as a first object, according to the positions of the plurality of objects. The 3D display device adjusts a visible range according to positions of the first group and the first object. A method for adjusting a visible range is also disclosed herein.

16 Claims, 7 Drawing Sheets

Fig. 5A — Position A

Fig. 5B — Position B

DISPLAY SYSTEM AND METHOD FOR ADJUSTING VISIBLE RANGE

RELATED APPLICATIONS

This application claims priority to Taiwan Application Serial Number 102147574, filed Dec. 20, 2013, which is herein incorporated by reference.

BACKGROUND

Field of Invention

The present invention relates to a display system and an adjusting method. More particularly, the present invention relates to a display system capable of adjusting a visible range and a method for adjusting a visible range.

Description of Related Art

As technology advances, image playback mode has gradually evolved from a conventional 2D (two-dimensional) mode to a 3D (three-dimensional) mode. 3D trend is expected to soar especially after the success of James Cameron's epic Avatar in 2009. One after another, display manufacturers release 3D display devices to meet the demand.

However, conventional 3D display devices generate duplicate 3D visions in an interlaced region of display periods and such region is called an image dead zone. When a user is in an image dead zone, images viewed by the user are incorrect images, causing inconveniences.

In view of the foregoing, there are problems and disadvantages associated with existing products that await further improvement. However, those skilled in the art have been unable to find a solution.

SUMMARY

The present invention provides a display device comprises an image processing device and a 3D (three-dimensional) display device. The image processing device captures and processes images of a plurality of objects to obtain positions of the plurality of objects. When a distance between at least two of the plurality of objects is smaller than a predetermined distance, the image processing device sets the at least two objects as a first group and sets an object of the plurality of objects that is closest to the first group as a first object, according to the positions of the plurality of objects. The 3D display device adjusts a visible range according to positions of the first group and the first object.

An aspect of the present invention provides a display system comprises an image processing device and a 3D (three-dimensional) display device. The image processing device captures and processes images of a plurality of objects to obtain positions of the plurality of objects. The image processing device determines a distance between any two objects of the plurality of objects based on the positions of the plurality of objects, and when there are at least two pairs of objects have a distance smaller than a predetermined distance, the image processing device sets the at least two pairs of objects to be a first group and a second group. The 3D display device adjusts a visible range according to positions of the first group and the second group.

An aspect of the present invention provides a method for adjusting a visible range comprises capturing and processing images of a plurality of objects to obtain positions of the plurality of objects; when a distance between at least two of the plurality of objects is smaller than a predetermined distance, setting the at least two objects as a first group according to the positions of the plurality of objects; setting an object of the plurality of objects that is closest to the first group as a first object; and adjusting a visible range according to positions of the first group and the first object.

An aspect of the present invention provides a method for adjusting a visible range comprises: capturing and processing images of a plurality of objects to obtain positions of the plurality of objects; determining a distance between any two objects of the plurality of objects based on the positions of the plurality of objects, and when there are at least two pairs of objects have a distance smaller than a predetermined distance, setting the at least two pairs of objects to be a first group and a second group; and adjusting a visible range according to positions of the first group and the second group.

In summary, embodiments of the present invention illustrate a display system and a method of adjusting a visible range to improve an issue of a user viewing incorrect images due to being in the image dead zone.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5A is a diagram illustrating operations of shifting a visible range of a 3D display device according to embodiments of the present invention.

FIG. 5B is a diagram illustrating operations of shifting a visible range of a 3D display device according to embodiments of the present invention.

DESCRIPTION OF THE EMBODIMENTS

Figure 1:
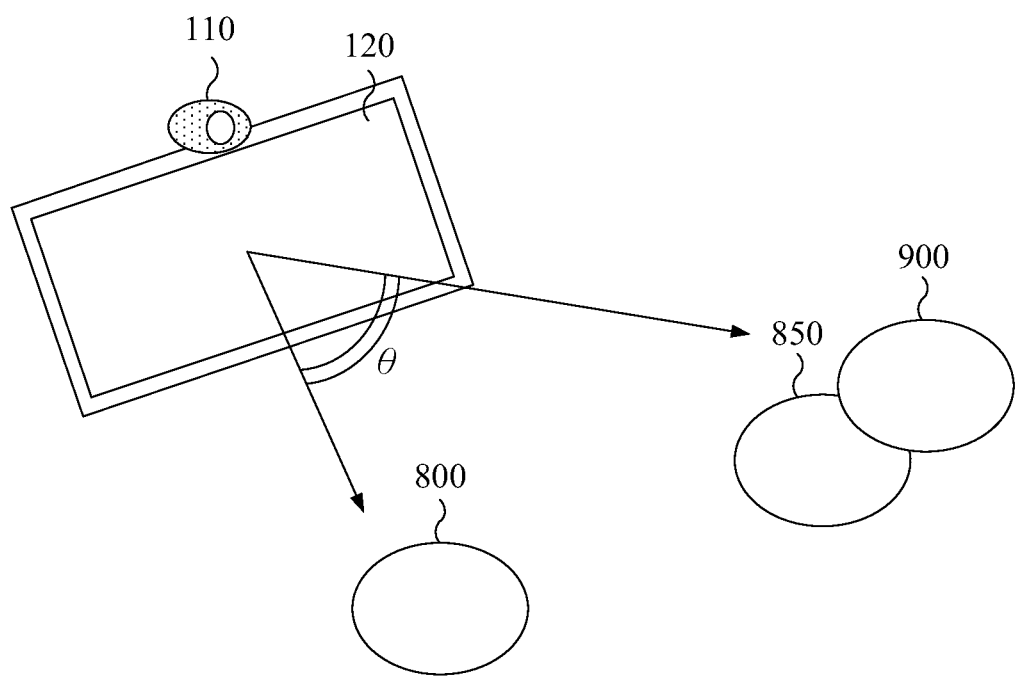
FIG. 1 is a diagram illustrating a display system according to embodiments of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a diagram illustrating a display system according to embodiments of the present invention. As shown in FIG. 1, a visible range of a 3D (three-dimensional) display device 120 is represented by arrows in solid lines. The angle of the visible range is θ. Users 800 and 900 are at two boundaries of the visible range respectively, and the boundaries are interlaced regions of display periods of the display system. The boundaries are the regions where duplicate visions would occur, and the interlaced regions are called the image dead zones. Since the users 800 and 900 are in the image dead zone respectively, images viewed by the users 800 and 900 are incorrect images. The display system of the present invention, which is detailed below, can effectively solve the problem.

Figure 2A:
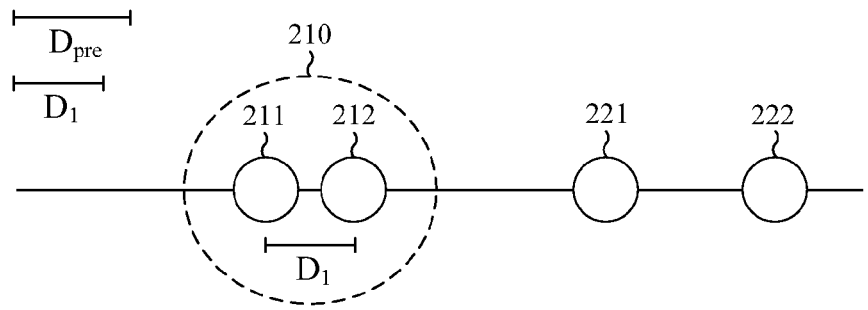
FIG. 2A is a diagram illustrating operations of adjusting a visible range of a display system according to embodiments of the present invention.
Figure 2B:
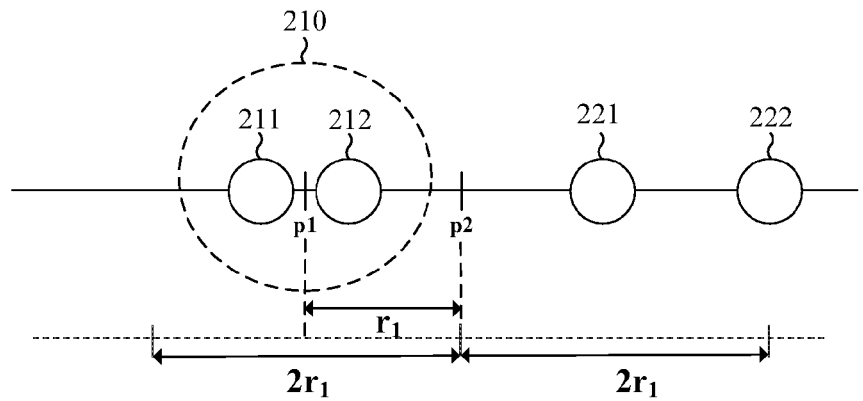
FIG. 2B is a diagram illustrating operations of adjusting a visible range of a display system according to embodiments of the present invention.
Figure 2C:
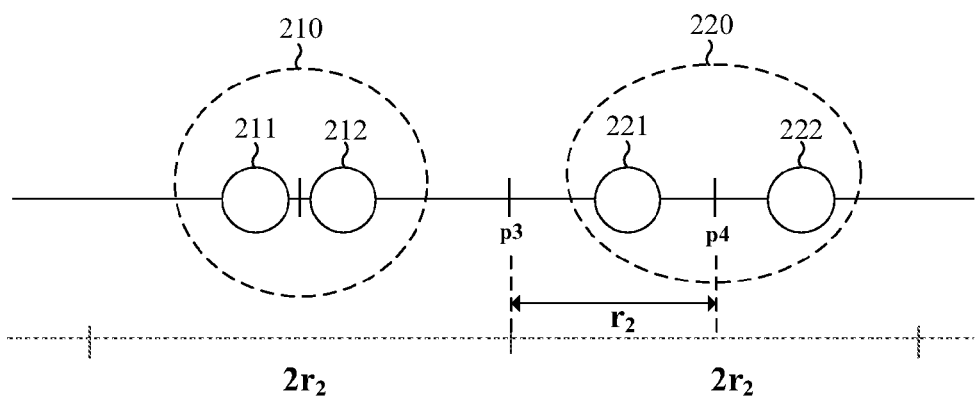
FIG. 2C is a diagram illustrating operations of adjusting a visible range of a display system according to embodiments of the present invention.

Reference is now made to FIG. 1. The image processing device 110 can capture and process images of a plurality of users 800, 850 and 900, so as to obtain positions of the users 800, 850 and 900. To facilitate understanding of operations of the display system of the present invention, reference is also made to FIG. 2A~2C. FIG. 2A~2C are diagrams illustrating operations of adjusting a visible range of a display system according to embodiments of the present invention. As shown in FIG. 2A, the image processing device 110 has obtained the positions of the users. When a distance between at least two of the users is smaller than a predetermined distance $D_{pre}$, the image processing device 110 sets the at least two users as a first group, according to positions of the users. For instance, a distance $D_1$ between users 211 and 212 is less than the predetermined distance $D_{pre}$, so the image processing device 110 sets the users 211 and 212 as a first group 210. The image processing device 110 further sets a user 221 who is closest to the first group 210 as the first user.

Reference is now made to FIG. 2B. The 3D display device 120 adjusts the visible range to be the visible range $2r_1$ (i.e. two times $r_1$) according to positions of the first group 210 and the first user 221. Assuming only users 211, 212 and 221 are in front of the display system, the 3D display device 120 can adjust a visible range to be the visible range $2r_1$ according to above operations of the display system of the present invention. Hence, all users 211, 212 and 221 are then within the visible range $2r_1$ and are able to view correct 3D images. In other words, operations of the display system of the present invention can shift boundaries (i.e. image dead zone) of the visible range $2r_1$ to regions where no users are present, so as to prevent users from viewing incorrect images due to being in the image dead zone. In one embodiment, the 3D display device 120 can be realized by a lenticular lens type display device, or a barrier type display device, but is not limited thereto. Those skilled in the art can selectively utilize any electronic component capable of displaying a 3D image to realize the present invention.

More specifically, operations of adjusting a visible range can be described as below. The image processing device 110 sets a distance between a center point p1 of the first group 210 and a center point p2 between the first group 210 and the first user 221 to be a first distance $r_1$. The 3D display device 120 adjusts a visible range to be the visible range $2r_1$ according to the first distance $r_1$ and therefore ensures all users 211, 212 and 221 are within the visible range $2r_1$. In the present embodiment, the first distance $r_1$ can be set to be a radius of the visible range $2r_1$.

Reference is now made to FIG. 2B. Assuming users 211, 212, 221 and 222 are in front of the display system, the user 222 would still be at a boundary (i.e. image dead zone) of the visible range $2r_1$ after the 3D display device 120 has adjusted the visible range to be the visible range $2r_1$, so the user 222 would still perceive incorrect images. To prevent such issue, in another embodiment, the image processing device 110 can further determine whether positions of the users 211, 212, 221 and 222 are within the visible range $2r_1$. Reference is now made to FIG. 2C. If not all users are within the visible range $2r_1$, the image processing device 110 sets the user 222 who is closest to the first user 221 to be the second user. The image processing device 110 then sets the first user 221 and the second user 222 to be a second group 220. The 3D display device 120 adjusts the visible range $2r_1$ to be the visible range $2r_2$ (i.e. two times $r_2$) according to positions of the first group 210 and the second group 220. Consequently, all users 211, 212, 221 and 222 are within the visible range $2r_2$ and can view correct 3D images.

More specifically, reference is now made to FIG. 2C. The image processing device 110 sets a distance between a center point p4 of the second group 220 and a center point p3 between the first group 210 and the second group 220 to be the second distance $r_2$. The 3D display device 120 then adjusts a visible range to be the visible range $2r_2$ according to the second distance $r_2$, so as to ensure users 211, 212, 221 and 222 are all within the visible range $2r_2$.

Figure 3A:
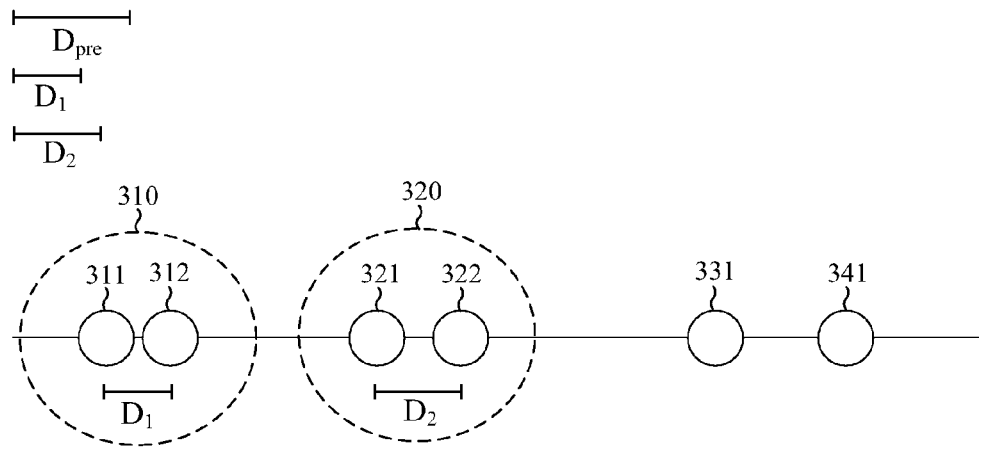
FIG. 3A is a diagram illustrating operations of adjusting a visible range of a display system according to embodiments of the present invention.
Figure 3B:
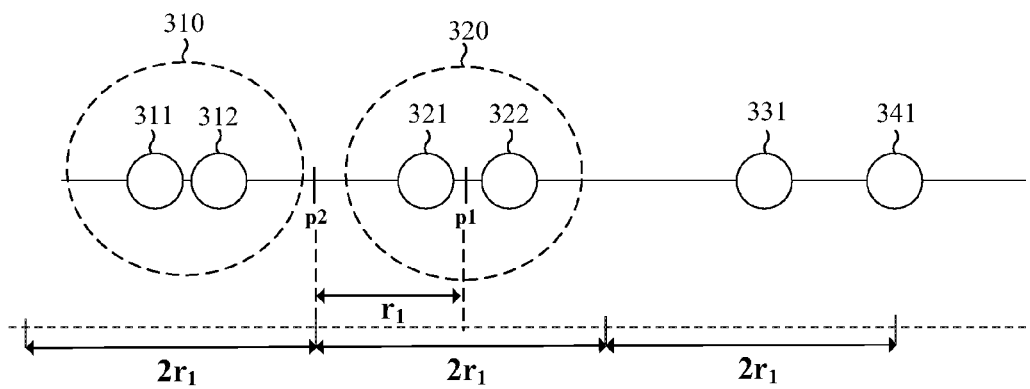
FIG. 3B is a diagram illustrating operations of adjusting a visible range of a display system according to embodiments of the present invention.
Figure 3C:
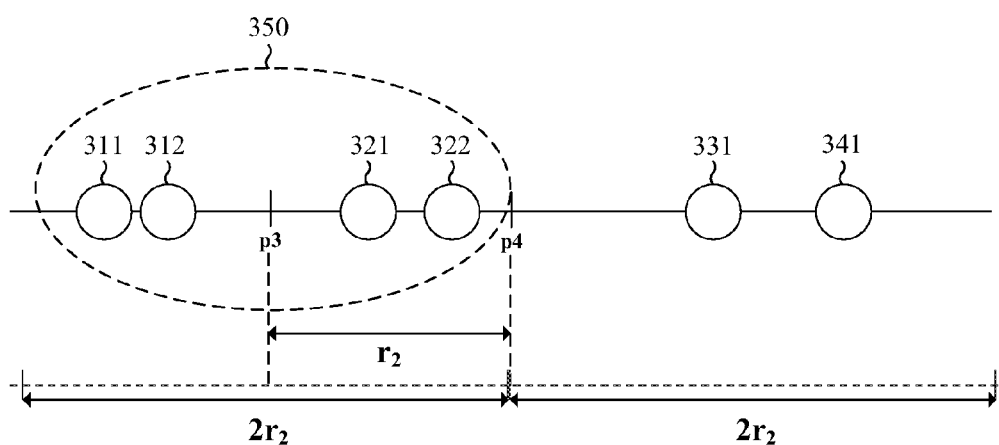
FIG. 3C is a diagram illustrating operations of adjusting a visible range of a display system according to embodiments of the present invention.

For solving problems existing in prior arts, operations of a display system of the present invention include other embodiments as shown below. Reference is now made to FIG. 3A~3C. FIG. 3A~3C are diagrams illustrating operations of adjusting a visible range of a display system according to embodiments of the present invention. As shown in FIG. 3A, after positions of the users are obtained, the image processing device 110 sets users having a distance less than the predetermined distance $D_{pre}$ in between the users to be a first group and a second group by clustering, according to positions of the users. For instance, a distance $D_1$ between the users 311 and 312 is smaller than the predetermined distance $D_{pre}$ and the users 311 and 312 are relatively close to each other (i.e. clustering), so the image processing device 110 sets the users 311 and 312 to be a first group 310. A distance $D_2$ between the users 321 and 322 is smaller than the predetermined distance $D_{pre}$ and the users 321 and 322 are relatively close to each other (i.e. clustering), so the image processing device 110 sets the users 321 and 322 to be a second group 320.

Reference is now made to FIG. 3B. The 3D display device 120 then adjusts a visible range to be the visible range $2r_1$ (i.e. two times $r_1$) according to positions of the first group 310 and the second group 320. Assuming only users 311, 312, 321, 322 and 331 are in front of the display system, the 3D display device 120 can adjust the visible range to be the visible range $2r_1$ according to the above operations of the display system of the present invention, so as to ensure all users 311, 312, 321, 322 and 331 are within the visible range $2r_1$ and can view the correct images. In other words, the above operations of the display system of the present invention can shift the boundaries (i.e. the image dead zones) of the visible range $2r_1$ to regions where no users are present, in order to prevent users from viewing incorrect images due to being in the image dead zone.

More specifically, in the above operations of adjusting the visible range, the image processing device 110 sets a group, out of the first group 310 and the second group 320, having a larger distance in between the users to be the main group 320 and sets the other group to be an auxiliary group 310. The image processing device 110 then sets a distance between a center point p1 of the main group 320 and a center point p2 between the main group 320 and the auxiliary group 310 to be a first distance $r_1$. The 3D display device 120 then adjusts a visible range to be the visible range $2r_1$ according to the first distance $r_1$ and ensures all users 311, 312, 321, 322 and 331 are within the visible range $2r_1$. In the present embodiment, the first distance $r_1$ can be set to be a radius of the visible range $2r_1$.

Reference is now made to FIG. 3B. Assuming users 311, 312, 321, 322, 331 and 341 are in front of the display system, after the 3D display device 120 has adjusted the visible range to be the visible range $2r_1$, the user 341 is still at the boundary (i.e. the image dead zone) of the visible range $2r_1$ and the user 341 would still view incorrect images. Hence the image processing device 110 can further determine whether positions of the users 311, 312, 321, 322, 331 and 341 are within the visible range $2r_1$. If not, the image processing device 110 sets the auxiliary group 310 and a group, or a user, that is closest to the auxiliary group 310 to be a third group. For instance, the group or user that is closest to the auxiliary group 310 is the group 320. Hence the image processing device 110 sets the auxiliary group 310 and the group 320 to be the third group 350 and sets the user 331 closest to the third group 350 to be the second user. The 3D display device 120 adjusts a visible range to be the visible range $2r_2$ (i.e. two times $r_2$) according to positions of the third group 350 and the second user 331.

More specifically, the image processing device 110 sets a distance between a center point p3 of third group 350 and a center point p4 between the third group 350 and the second user 331 to be a second distance $r_2$. The 3D display device 120 adjusts a visible range to be the visible range $2r_2$ according to the second distance $r_2$, in order to ensure all users 311, 312, 321, 322, 331 and 341 are within the visible range $2r_2$.

Figure 4A:
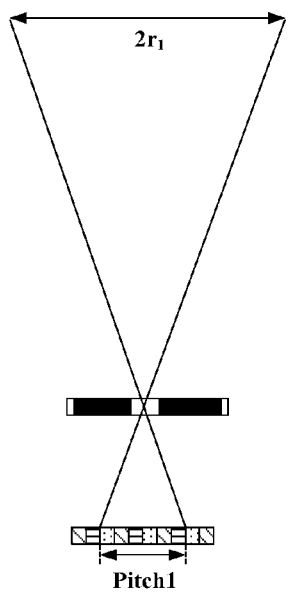
FIG. 4A is a diagram illustrating operations of adjusting a visible range of a 3D display device according to embodiments of the present invention.
Figure 4B:
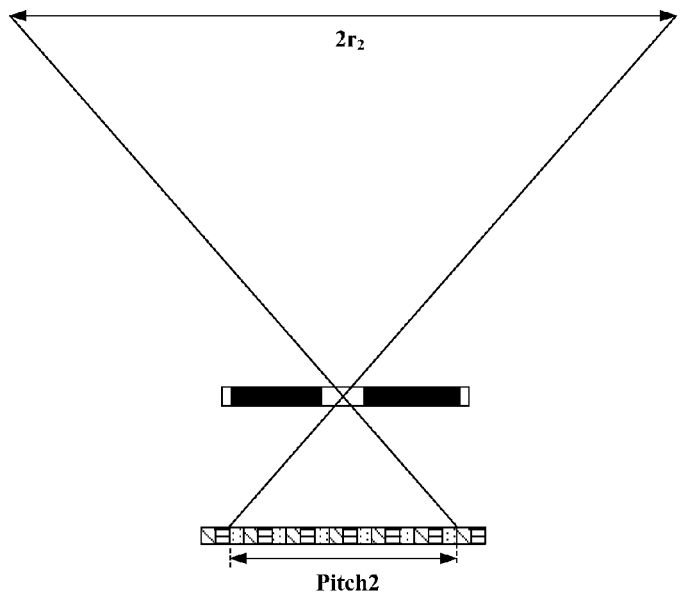
FIG. 4B is a diagram illustrating operations of adjusting a visible range of a 3D display device according to embodiments of the present invention.

Reference is now made to FIG. 4A and FIG. 4B. FIG. 4A and FIG. 4B are diagrams illustrating operations of adjusting a visible range of the 3D display device 120 according to embodiments of the present invention. In FIG. 4A and FIG. 4B, the 3D display device 120 is realized with a barrier type display device. Reference is now made to FIG. 2B, FIG. 3B and FIG. 4A. When the barrier type display device is about to adjust its visible range, each pitch of a periodic structure of the barrier type display device can be adjusted to be Pitch1, so as to adjust the visible range to be the visible range $2r_1$. Subsequently, reference is now made to FIG. 2C, FIG. 3C and FIG. 4B. When the barrier type display device is about to adjust its visible range, each pitch of the periodic structure of the barrier type display device can be adjusted to be Pitch2, so as to adjust the visible range from the visible range $2r_1$ to be the visible range $2r_2$.

Figure 5C:
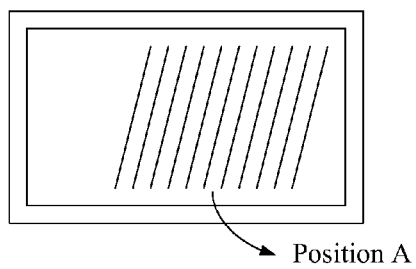
FIG. 5C is a diagram illustrating operations of shifting a visible range of the 3D display device according to embodiments of the present invention.
Figure 5C:
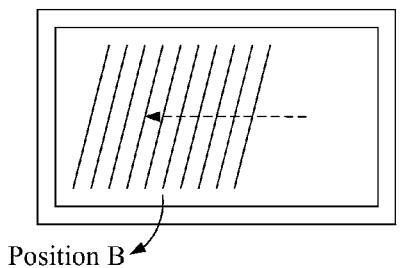
Figure 5C:
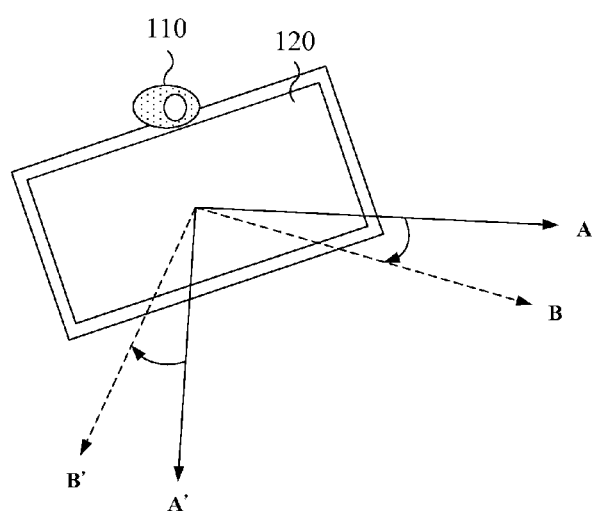

FIG. 5A~FIG. 5C are diagrams illustrating shifting a visible range of the 3D display device 120 according to embodiments of the present invention. In FIG. 5A~FIG. 5C, the 3D display device 120 is realized with a barrier type display device as an example. Compared to previous embodiments of adjusting a size of a visible range, the display system of the present embodiment can shift a visible range by shifting a periodic structure of the barrier type display device, so as to ensure all users are within the visible range. Reference is now made to FIG. 5A and FIG. 5B. The periodic structure of the barrier type display device is shifted from a position A shown in FIG. 5A to a position B shown in FIG. 5B. Accordingly, a visible range AA' of the barrier type display device shown in FIG. 5C is shifted to a visible range BB'. The barrier type display device 120 can therefore shift the visible range to where a user is positioned. The display system of the present invention can either adjust a size of the visible range or shift the visible range, or utilize both methods, according to actual requirements, in order to ensure all users are within the visible range.

Figure 6:
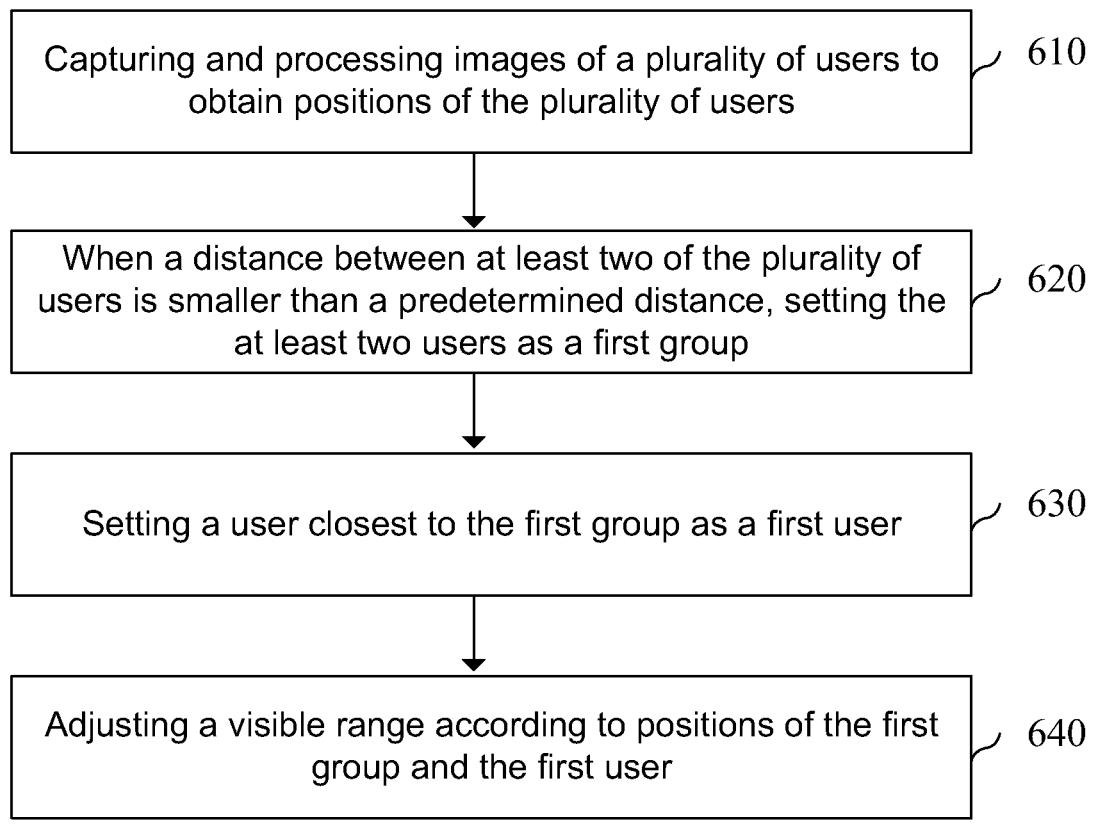
FIG. 6 is a flowchart illustrating a method for adjusting a visible range according to embodiments of the present invention.

FIG. 6 is a flowchart illustrating a method for adjusting a visible range according to embodiments of the present invention. As illustrated, the method 600 for adjusting a visible range includes steps of:

Step 610: capturing and processing images of a plurality of users to obtain positions of the plurality of users;

Step 620: when a distance between at least two of the plurality of users is smaller than a predetermined distance, setting the at least two users as a first group;

Step 630: setting a user closest to the first group as a first user; and

Step 640: adjusting a visible range according to positions of the first group and the first user.

To facilitate understanding to the method 600 for adjusting a visible range of the present invention, reference is now made to FIG. 1 and FIG. 2A~FIG. 2C. In step 610, capturing and processing images of a plurality of users can be performed by the image processing device 110, so as to obtain positions of the plurality of users. In step 620, according to positions of the users, setting the users 211 and 212 to be the first group 210 can be performed by the image processing device 110, as the distance $D_1$ between users 211 and 212 is less than the predetermined distance $D_{pre}$. In step 630, setting the user 221 who is closest to the first group 210 to be the first user can be performed by the image processing device 110. In step 640, adjusting the visible range $2r_1$ (i.e. two times $r_1$) according to positions of the first group 210 and the first user 221 can be performed by the 3D display device 120. Assuming only users 211, 212 and 221 are in front of the display system, the method 600 for adjusting a visible range of the present invention can adjust the visible range to be the visible range $2r_1$, so all users 211, 212 and 221 are within the visible range $2r_1$. Hence all users can view correct 3D images, instead of viewing incorrect images due to being in the image dead zone.

Reference is now made to FIG. 2B. In one embodiment, the method 600 for adjusting a visible range of the present invention can further include: setting a distance between a center point p1 of the first group 210 and a center point p2 between the first group 210 and the first user 221 to be a first distance $r_1$ by the image processing device 110; and adjusting a visible range to be the visible range $2r_1$ according to the first distance $r_1$ by the 3D display device 120.

Reference is now made to FIG. 2C. In another embodiment, assuming users 211, 212, 221 and 222 are in front of the display system, the method 600 for adjusting a visible range of the present invention can further include: determining whether users 211, 212, 221 and 222 are all within the visible range $2r_1$ by the image processing device 110; if not, setting the first user 221 and the user 222 who is closest to the first user 221 to be the second group 220 by the image processing device 110; and adjusting a visible range to be the visible range $2r_2$ according to positions of the first group 210 and the second group 220 by the 3D display device 120.

Reference is now made to FIG. 2C. In another embodiment, the method 600 for adjusting a visible range of the present invention can further include: setting a distance between a center point p4 of the second group 220 and a center point p3 between the first group 210 and the second group 220 to be a second distance $r_2$ by the image processing device 110; and adjusting a visible range to be the visible range $2r_2$ (i.e. two times $r_2$) according to the second distance $r_2$ by the 3D display device 120.

Figure 7:
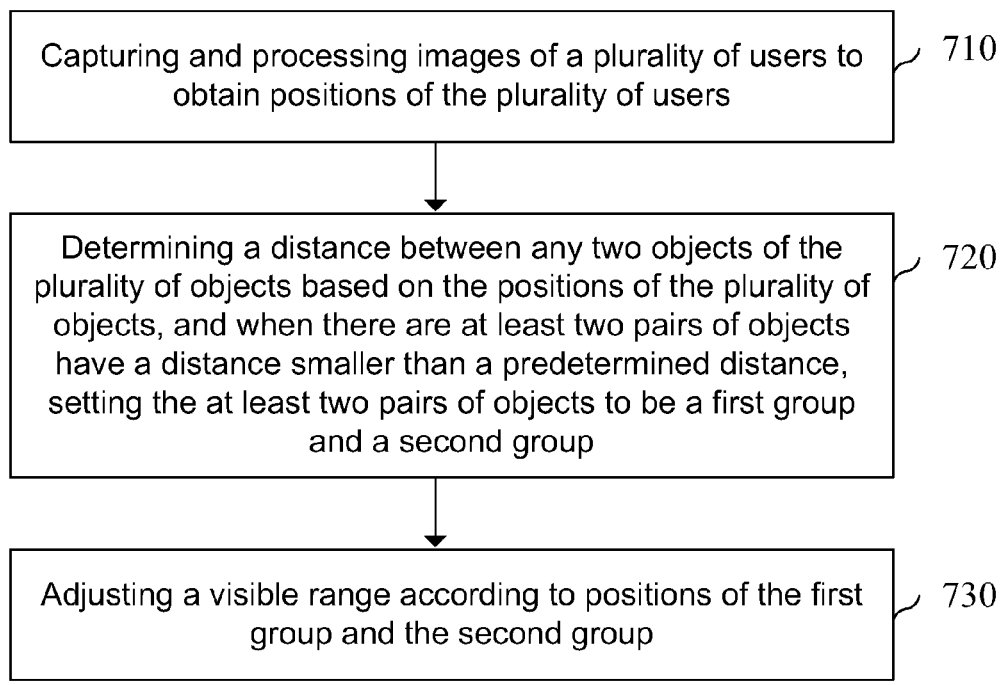
FIG. 7 is a flowchart illustrating a method for adjusting a visible range according to embodiments of the present invention.

FIG. 7 is a flowchart illustrating a method for adjusting a visible range according to embodiments of the present invention. As illustrated, the method 700 for adjusting a visible range includes steps of:

Step 710: capturing and processing images of a plurality of users to obtain positions of the plurality of users;

Step 720: determining a distance between any two objects of the plurality of objects based on the positions of the plurality of objects, and when there are at least two pairs of objects have a distance smaller than a predetermined distance, setting the at least two pairs of objects to be a first group and a second group; and Step 730: adjusting a visible range according to positions of the first group and the second group.

To facilitate understanding to the method 700 for adjusting a visible range of the present invention, reference is now made to FIG. 1 and FIG. 3A~FIG. 3C. In step 710, capturing and processing images of a plurality of users can be performed by the image processing device 110, so as to obtain positions of the plurality of users. In step 720, determining a distance between any two users based on the positions of the users can be performed by the image processing device 110, and when there are at least two pairs of users have a distance smaller than a predetermined distance $D_{pre}$, setting the at least two pairs of users to be a first group and a second group by clustering can be performed by the image processing device 110. Reference is now made to FIG. 3A. The distance $D_1$ between the users 311 and 312 is less than the predetermined distance $D_{pre}$ so the image processing device 110 sets the users 311 and 312 to be the first group 310. The distance $D_2$ between the users 321 and 322 is less than the predetermined distance $D_{pre}$ so the image processing device 110 sets the users 321 and 322 to be the second group 320.

Reference is now made to FIG. 3B and step 730. In step 730, adjusting a visible range according to positions of the first group and the second group can be performed by the 3D display device 120. Assuming only users 311, 312, 321, 322 and 331 are in front of the display system, the method 700 for adjusting a visible range of the present invention can adjust a visible range to be the visible range $2r_1$, so as to ensure all users 311, 312, 321, 322 and 331 are within the visible range $2r_1$, and all users are thereby able to view correct 3D images, instead of viewing incorrect images due to being in the image dead zone.

Reference is now also made to FIG. 3B. In another embodiment, the method 700 for adjusting a visible range of the present invention can further include: setting a group, out of the first group 310 and the second group 320, having a larger distance in between the users to be the main group 320 and the other group to be an auxiliary group 310 by the image processing device 110; setting a distance between a center point p1 of the main group 320 and a center point p2 between the main group 320 and the auxiliary group 310 to be a first distance $r_1$ by the image processing device 110; and adjusting a visible range to be the visible range $2r_1$ (i.e. two times $r_1$) according to the first distance $r_1$ by the 3D display device 120.

Reference is now also made to FIG. 3C. Assuming users 311, 312, 321, 322, 331 and 341 are in front of the display system, the method 700 for adjusting a visible range of the present invention can further include: determining whether positions of the users 311, 312, 321, 322, 331 and 341 are within the visible range $2r_1$ by the image processing device 110; if not, setting the auxiliary group 310 and the group 320 which is closest to the auxiliary group 310 to be a third group 350 by the image processing device 110; setting a user 331 who is closest to the third group 350 to be a second user by the image processing device 110; and adjusting a visible range to be the visible range $2r_2$ (i.e. two times $r_2$) according to positions of the third group 350 and the second user 331 by the 3D display device 120.

Reference is now also made to FIG. 3C. In another embodiment, the method 700 for adjusting a visible range of the present invention can further include: setting distance between a center point p3 of the third group 350 and a center point p4 between the third group 350 and the second user 331 to be a second distance $r_2$ by the image processing device 110; and adjusting a visible range to be the visible range $2r_2$ according to the second distance $r_2$ by the 3D display device 120.

The methods for adjusting a visible range in the above mentioned embodiments can all be performed by software, hardware and/or firmware. For instance, if execution speed and accuracy are primary concerns, hardware and/or firmware may be preferred; if design flexibility is the primary concern, software may be preferred. Alternatively, execution can also be carried out by software, hardware and firmware all together. The examples above are not better or worse than one another and are not meant to limit a scope of the present invention. Those skilled in the art can design how the method is performed according to actual requirements.

Steps of the method for adjusting a visible range of the present invention are named according to respective functions. The naming convention is merely for illustrative purposes and is not meant to limit functions of the corresponding step. Each step can all be integrated as one step or split into more steps. An order of the steps can also be changed. Such arrangements are all within a scope of the present invention.

In summary, embodiments of the present invention illustrate a display system and a method for adjusting a visible range to improve an issue of a user viewing incorrect images due to being in the image dead zone.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display device, comprising:
    an image processing device configured to capture and process images of a plurality of objects to obtain positions of the plurality of objects, wherein when a distance between at least two of the plurality of objects is smaller than a predetermined distance, the image processing device sets the at least two objects as a first group and sets an object of the plurality of objects that is closest to the first group as a first object, according to the positions of the plurality of objects; and a 3D (three-dimensional) display device configured to adjust a visible range according to positions of the first group and the first object;

wherein the image processing device sets a distance between a center point of the first group and a center point between the first group and the first object to be a first distance, wherein the 3D display device adjusts the visible range according to the first distance.

2. The display system of claim 1, wherein the first distance is a radius of the visible range.

3. The display system of claim 1, wherein the image processing device determines whether the positions of the plurality of objects are all within the visible range, if not, the image processing device sets the first object and a second object of the plurality of objects that is closest to the first object to be a second group, and the 3D display device adjusts the visible range according to positions of the first group and the second group.

4. The display system of claim 3, wherein the image processing device sets a distance between a center point of the second group and a center point between the first group and the second group to be a second distance, and the 3D display device adjusts the visible range according to the second distance.

5. The display system of claim 1, wherein the 3D display device adjusts the visible range by adjusting a pitch of a periodic structure of the 3D display device.

6. A display system, comprising:
an image processing device configured to capture and process images of a plurality of objects to obtain positions of the plurality of objects, wherein the image processing device determines a distance between any two objects of the plurality of objects based on the positions of the plurality of objects, and when there are at least two pairs of objects have a distance smaller than a predetermined distance, the image processing device sets the at least two pairs of objects to be a first group and a second group; and a 3D (three-dimensional) display device configured to adjust a visible range according to positions of the first group and the second group;

wherein the image processing device sets a group, out of the first group and the second group, having a larger distance in between the at least two objects to be a main group, and another group to be an auxiliary group, the image processing device sets a distance between a center point of the main group and a center point between the main group and the auxiliary group to be a first distance, and the image processing device adjusts the visible range according to the first distance.

7. The display system of claim 6, wherein the first distance is a radius of the visible range.

8. The display system of claim 6, wherein the image processing device determines whether the positions of the plurality of objects are all within the visible range, If not, the image processing device sets the auxiliary group and a candidate object to be a third group, wherein the candidate object is a group or one of the plurality of objects that is closest to the auxiliary group, and sets one of the plurality of objects that is closest to the third group to be a second object, and 3D display device adjusts the visible range according to positions of the third group and the second object.

9. The display system of claim 8, wherein the image processing device sets a distance of between a center point of the third group and a center point between the third group and the second object to be a second distance, and the 3D display device adjusts the visible range according to the second distance.

10. The display system of claim 6, wherein the 3D display device adjusts the visible range by adjusting a pitch of a periodic structure of the 3D display device.

11. A method for adjusting a visible range, comprising:
capturing and processing images of a plurality of objects to obtain positions of the plurality of objects;

when a distance between at least two of the plurality of objects is smaller than a predetermined distance, setting the at least two objects as a first group according to the positions of the plurality of objects;

setting an object of the plurality of objects that is closest to the first group as a first object;

adjusting a visible range according to positions of the first group and the first object; and setting a distance between a center point of the first group and a center point between the first group and the first object as a first distance;

wherein adjusting the visible range according to the positions of the first group and the first object comprises:

adjusting the visible range according to the first distance.

12. The method for adjusting the visible range of claim 11, further comprising:
determining whether the positions of the plurality of objects are all within the visible range;

if not, setting the first object and a second object of the plurality of objects that is closest to the first object as a second group; and adjusting the visible range according to positions of the first group and the second group.

13. The method for adjusting the visible range of claim 12, further comprising:
setting a distance between a center point of the second group and a center point between the first group and the second group as a second distance;

wherein adjusting the visible range according to the positions of the first group and the second group comprises:

adjusting the visible range according to the second distance.

14. A method for adjusting a visible range, comprising:
capturing and processing images of a plurality of objects to obtain positions of the plurality of objects;

determining a distance between any two objects of the plurality of objects based on the positions of the plurality of objects, and when there are at least two pairs of objects have a distance smaller than a predetermined distance, setting the at least two pairs of objects to be a first group and a second group;

adjusting a visible range according to positions of the first group and the second group;

setting a group, out of the first group and the second group, having a larger distance in between the at least two objects to be a main group, and another group to be an auxiliary group; and setting a distance between a center point of the main group and a center point between the main group and the auxiliary group to be a first distance;

wherein adjusting the visible range according to the positions of the first group and the second group comprises:

adjusting the visible range according to the first distance.

15. The method for adjusting the visible range of claim 14, further comprising:

determining whether the positions of the plurality of objects are all within the visible range;

If not, setting the auxiliary group and a candidate object to be a third group, wherein the candidate object is a group or one of the plurality of objects that is closest to the auxiliary group;

setting one of the plurality of objects that is closest to the third group to be a second object; and adjusting the visible range according to positions of the third group and the second object.

16. The method for adjusting the visible range of claim 15, further comprising:

setting a distance between a center point of the third group and a center point between the third group and the second object to be a second distance;

wherein adjusting the visible range according to the positions of the third group and the second object comprises:

adjusting the visible range according to the second distance.

* * * * *